US012618708B2

(12) United States Patent
Han et al.

(10) Patent No.:    US 12,618,708 B2
(45) Date of Patent:         May 5, 2026

(54) EFFICIENT METHOD OF AUTOMATED BURIED CABLE DETERMINATION FOR CABLE STATUS MONITORING

(71) Applicant: NEC Laboratories America, Inc., Princeton, NJ (US)

(72) Inventors: Shaobo Han, Princeton, NJ (US); Ming-Fang Huang, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 239 days.

(21) Appl. No.: 18/316,205

(22) Filed: May 11, 2023

(65) Prior Publication Data

US 2023/0366726 A1       Nov. 16, 2023

Related U.S. Application Data

(60) Provisional application No. 63/341,446, filed on May 13, 2022.

(51) Int. Cl.
G01H 9/00          (2006.01)

(52) U.S. Cl.
CPC ................................... G01H 9/004 (2013.01)

(58) Field of Classification Search
CPC ...................................................... G01H 9/004
See application file for complete search history.

(56)                References Cited

U.S. PATENT DOCUMENTS

| | | | |
|---|---|---|---|
| 2014/0025319 A1* | 1/2014 | Farhadiroushan | E21B 47/007 |
| | | | 702/56 |
| 2014/0355383 A1* | 12/2014 | McEwen-King | G01H 9/004 |
| | | | 367/88 |
| 2018/0045768 A1* | 2/2018 | Godfrey | G01R 31/1209 |
| 2019/0072379 A1* | 3/2019 | Jalilian | G01B 11/18 |
| 2020/0124735 A1* | 4/2020 | Huang | G01H 9/004 |

* cited by examiner

*Primary Examiner* — Kristina M Deherrera
*Assistant Examiner* — Jean F Morello
(74) *Attorney, Agent, or Firm* — Vincent Duffy; Joseph Kolodka

(57)                ABSTRACT

A distributed fiber optic sensing (DFOS) system and method employing a fiber optic sensor cable that autonomously collects DFOS data and employs artificial intelligence/machine learning (AI/ML) to distinguish sections of the fiber optic sensor cable that are above ground (aerial), below ground (buried), and buried but occasionally above ground, in addition to any change(s) that occur with respect to the fiber optic sensor cable at such sections.

5 Claims, 11 Drawing Sheets

Buried Section #1          Aerial Section     Buried Section #2

Utility poles

DFOS System

Optical fiber          Ground

Abnormal status 1: underground cable exposed to the ground surface

Abnormal status 2: aerial cable touching the ground

Buried Section #1  Aerial Section  Buried Section #2

Utility poles

Optical fiber

DFOS System

Ground

Abnormal status 1: underground cable exposed to the ground surface

Abnormal status 2: aerial cable touching the ground

A new route is connecting to the central office

⬇

Send field engineers to survey the route and check the cable status periodically

⬇

Compare the observed cable status with the installation map (the map itself may not be accurate)

⬇

Write down the location of the cable that is abnormal and report to cable owners Connect a new fiber route to the DFOS system in the central office Continuous collecting the field data by DFOS system (DAS/DVS) for the whole route Run the Automated Buried Cable Determination (ABCD) Algorithm Cumulate long-term results as an objective baseline of cable status and detect change in real-time

*FIG. 5*

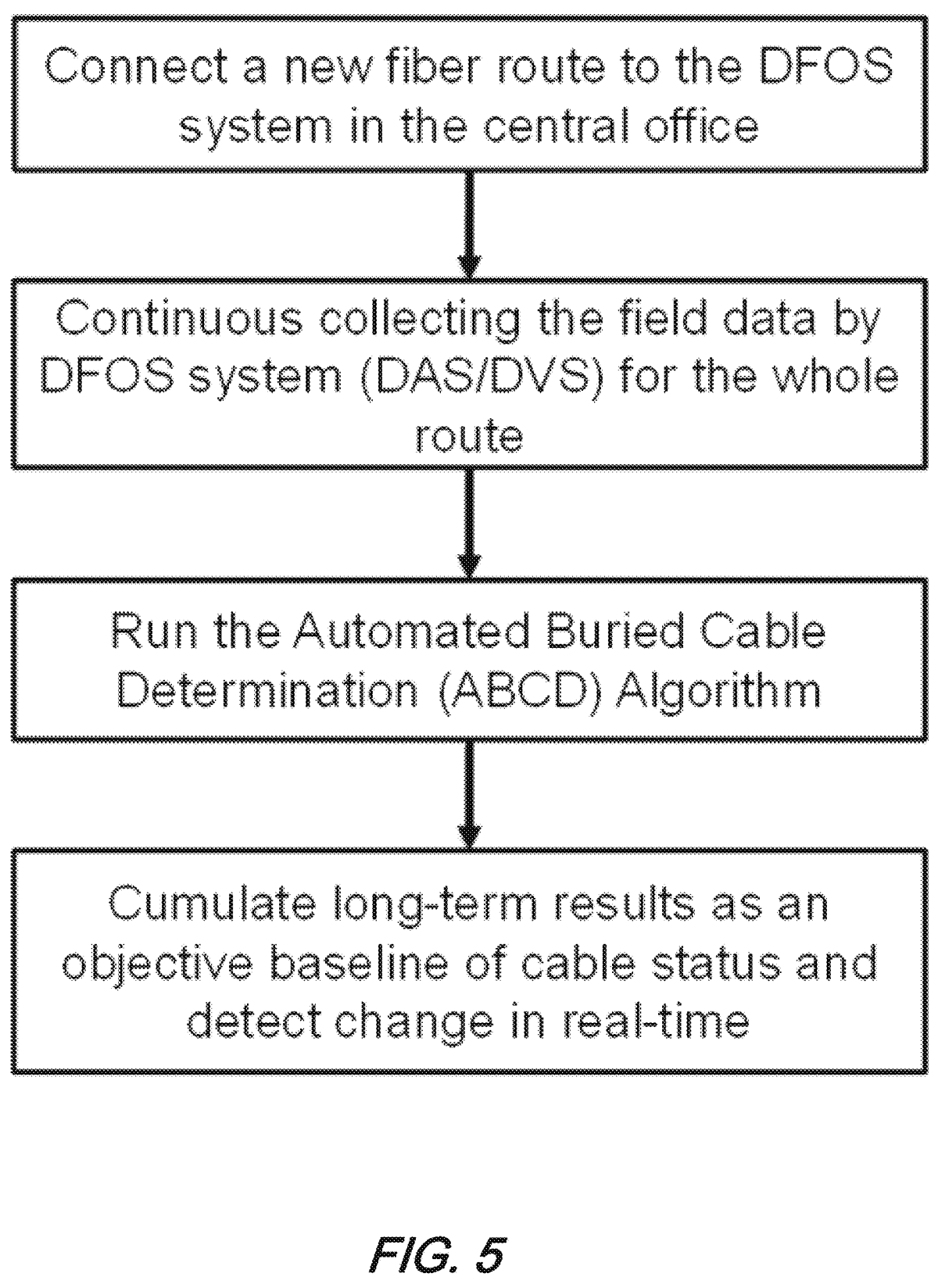

EFFICIENT METHOD OF AUTOMATED BURIED CABLE DETERMINATION FOR CABLE STATUS MONITORING

CROSS-REFERENCE TO RELATED APPLICATIONS

This application claims the benefit of U.S. Provisional Patent Application Ser. No. 63/341,446 filed May 13, 2022, the entire contents of which is incorporated by reference as if set forth at length herein.

FIELD OF THE INVENTION

This application relates generally to distributed fiber optic sensing (DFOS) systems, methods, structures and machine learning (ML) technologies. More particularly, it pertains to an efficient method of automated buried cable determination for cable status monitoring.

BACKGROUND OF THE INVENTION

It is of critical importance for telecommunications service providers to possess the ability to distinguish the locations—above or below ground—of sections of telecommunications facilities in a quick and reliable manner. Unfortunately, there exists no such acceptable method for determining the location(s) of underground (buried) cables. As such, telecommunications service providers must dispatch service personnel to perform in-person determinations, a time-consuming and expensive procedure.

SUMMARY OF THE INVENTION

An advance in the art is made according to aspects of the present disclosure directed to a distributed fiber optic sensing (DFOS) system and method that employs artificial intelligence/machine learning (AI/ML) methodologies to provide an integrated system and method providing real-time monitoring of an entire optical fiber cable route and distinguishes buried cable from aerial cables automatically and instantly (<1 min for a 25 km route).

In sharp contrast to the prior art, systems, and methods according to aspects of the present disclosure provide for the autonomous determination of optical fiber cable location using AI/ML methodologies that advantageously: determines the buried sections of an optical fiber cable route; detects changes of status of the optical fiber cable route over time; wherein the AI/ML methodologies provide an automated operation; unsupervised—no manual labor is necessary when monitoring a new optical fiber cable route; no pre-training is required and no human annotation on data collection and classifiers training for each route separately; and is insensitive to field environmental conditions.

BRIEF DESCRIPTION OF THE DRAWING

FIG. 5 is a schematic flow diagram showing illustrative workflow of the automated buried optical fiber cable detection and determination according to aspects of the present disclosure;

DETAILED DESCRIPTION OF THE INVENTION

Figure 1A:
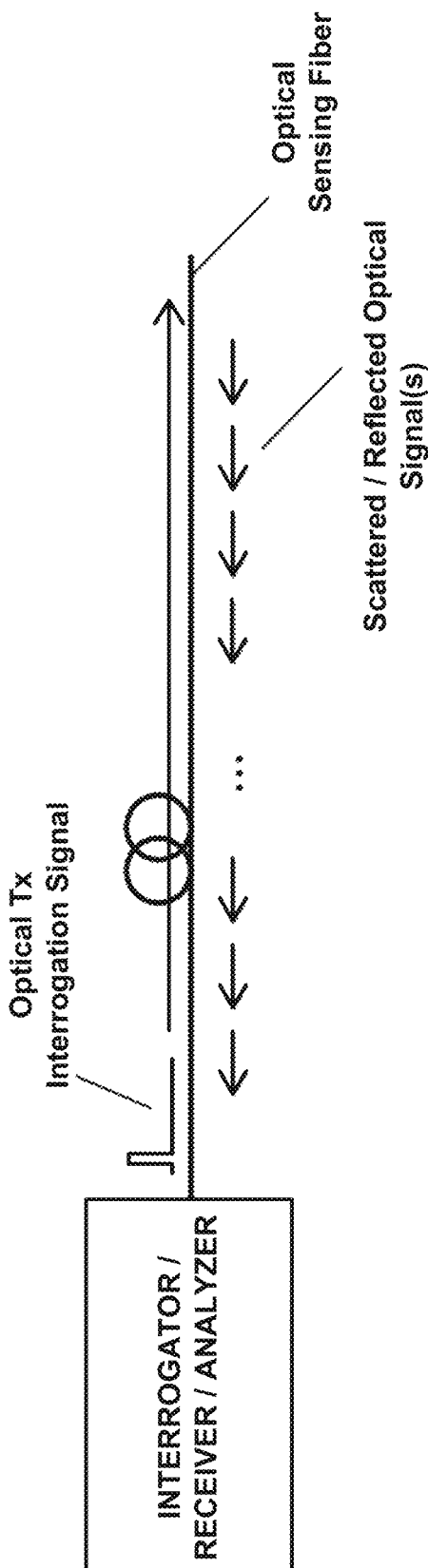
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect opto-electronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
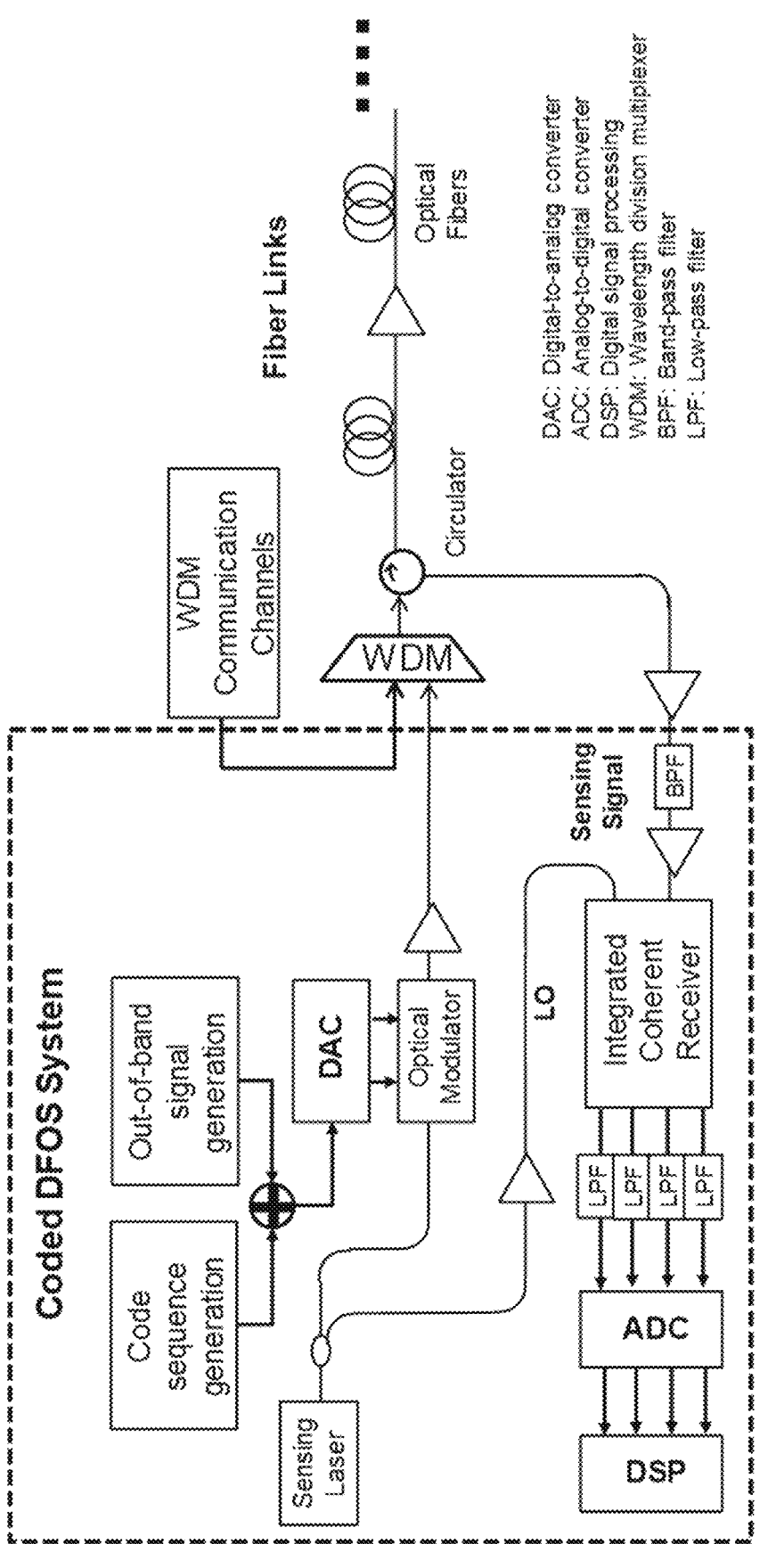

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

Figure 2:
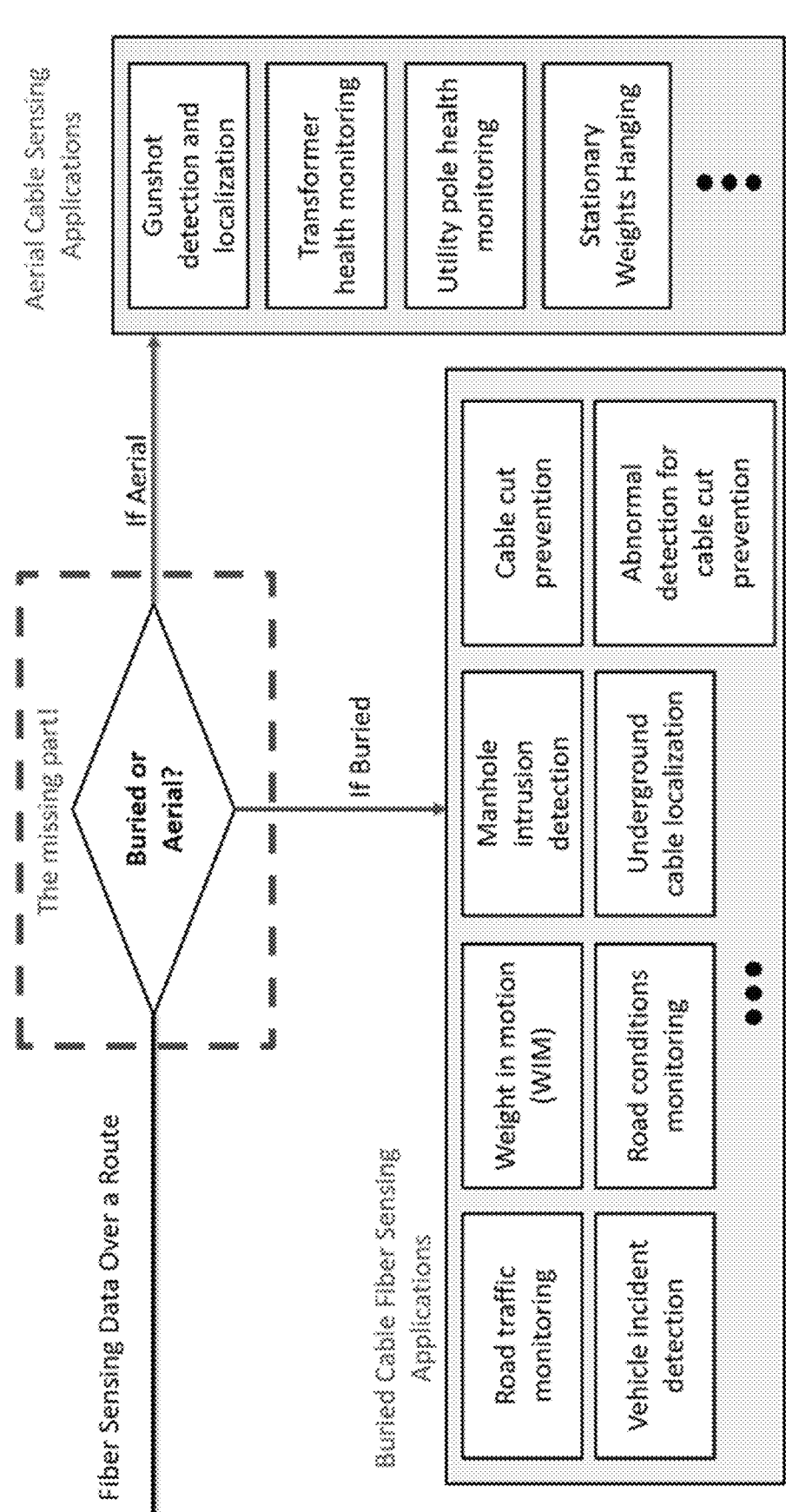
FIG. 2. Is a schematic diagram showing an illustrative operations of an automated buried cable determination according to aspects of the present disclosure.

FIG. 2. Is a schematic diagram showing an illustrative operations of an automated buried cable determination according to aspects of the present disclosure. With reference to that figure we note that our system and method according to aspects of the present disclosure employ a DFOS system in combination with AI/ML methodologies to provide an integrated system and method that monitors an entire optical fiber cable route in real time and a feature set including:

First real-time algorithm that surveys optical fiber cable status and distinguishes buried/aerial cables automatically and instantly (<1 min for a 25-km route).

Quick assigned AI modules for different applications, such as: Road traffic monitoring AI for buried cables; Pole and transformer health monitoring AI for aerial cables.

Immune to external influences including Environmental noise; Signal intensity and signal-to-noise ratio (SNR); Optical fiber cable buried depth; and Weather conditions.

Cable self-monitoring without requiring additional sensors.

Quick response of cable status to reduce the service downtime.

Figure 3:
FIG. 3 is a schematic diagram showing illustrative cable status monitoring application—normal vs. abnormal according to aspects of the present disclosure.

FIG. 3 is a schematic diagram showing illustrative cable status monitoring application—normal vs. abnormal according to aspects of the present disclosure. As schematically illustrated in FIG. 3, automated buried cable location determination is a missing aspect of optical fiber-based service provisioning and offering. While location determination is of critical importance, we note that optical fiber cable status monitoring is another important application of our inventive system and method. With our inventive approach however, we can now: 1) automatically determine the buried sections from a cable route based on the sensing data received from the DFOS system; 2) establish an operational baseline from long-term data with cumulated evidence; and 3) identify an abnormal status by comparing detection results against a historical baseline using moving windows of different lengths.

Figure 4:
FIG. 4 is a schematic flow diagram showing prior art workflow of existing, manual inspection and determination of optical fiber cable status.

FIG. 4 is a schematic flow diagram showing prior art workflow of existing, manual inspection and determination of optical fiber cable status. There are however, a number of known difficulties associated with such manual methods.

Unknown location from OTDR traces: Optical time domain reflectometer (OTDR) is arguably the most popular technique employed to check optical fiber loss and length. However, there is no information in the OTDR traces with respect to individual cable sections and no way to identify buried or aerial cables.

Blind zone of the field inspection: Due to geographical constraints, some cable spans may not be accessible such as under the river/lake/sea and inside a forest.

Inaccurate baseline map: Due to the non-up-to-date information, the baseline map may not be accurate.

Efficiency: A manual, field check performed by a technician is laborious and time-consuming, resulting in significant reporting time delay.

FIG. 5 is a schematic flow diagram showing illustrative workflow of the automated buried optical fiber cable detection and determination according to aspects of the present disclosure.

Figure 6:
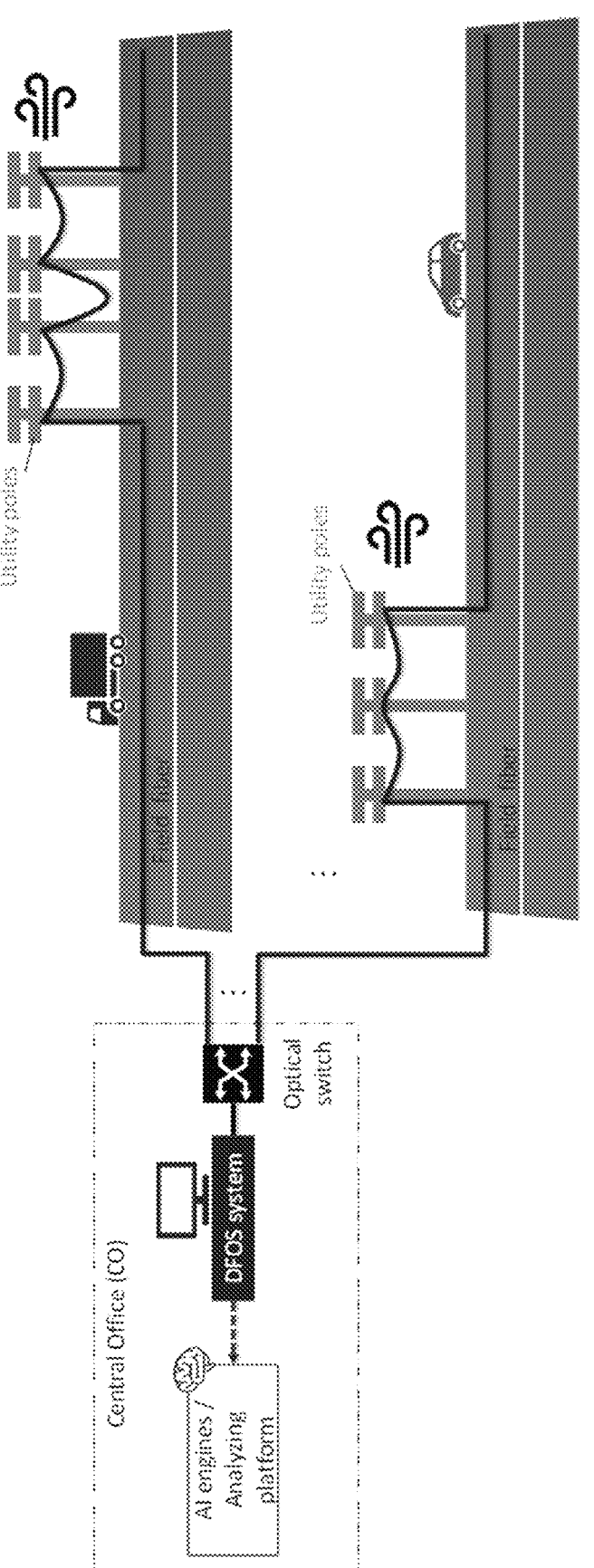
FIG. 6 is a schematic diagram showing illustrative system setup according to aspects of the present disclosure.

FIG. 6 is a schematic diagram showing illustrative system setup according to aspects of the present disclosure. With reference to that figure it may be observed that a distributed fiber optic sensing system (DFOS)—which can be distributed acoustic sensing (DAS) and/or distributed vibration sensing (DVS)— is shown located in a central control office/central office (CO) for remote monitoring of an entire fiber optic cable route. The DFOS system is shown integrated with an optical switch and connected to the optical sensing fibers to provide sensing functions on multiple fiber optic routes. Advantageously, the sensing fiber can be a dark fiber or operational fiber—carrying live telecommunications traffic of service providers.

In operation, our inventive AI engine employs specialized filtering and temporal smoothing procedures based on the signal characteristics, across the spatial-temporal-frequency domains. In a given application, in addition to any buried cable sections, there may also be aerial optical fiber cable sections, buried optical fiber cable that occasionally becomes exposed above ground, optical fiber cable located in a central office (often with generators and air conditioners inside the building), or optical fiber cable ends. According to aspects of the present disclosure, these different types of optical fiber sections can be identified as noise by a density-based spatial clustering algorithm. No matter how the over-all sensitivity of the optical fiber sensor fluctuates (due to weather-ground condition or differences in daytime or night time), the algorithm learns with self-adjustment. A key underlying assumption to our inventive method is that intensities from buried optical fiber cable section signals form a compact cluster in a one-dimensional intensity space, which is invariant across different routes.

Our Automated Buried Cable Determination (ABCD) method according to the present disclosure includes the following procedures:

For each chunk of fiber sensing data collected:

1: Frequency domain: Apply a special High-Pass Filter with cutting point frequency on the sensing signal and compute the aggregated intensities at each location, for every 120 ms.

2: Time domain: For each location, compute a number of summary statistics based on intensities over a period of time (e.g., 48 seconds).

The choice of quantile statistics is related to the parameter of the high-pass filter, depending on the targeted application. Such choices are illustratively shown in Table 1.

3: Spatial domain: Apply a designed Median Filter on the vector of quantile statistics.

4: Unsupervised learning: Perform DBSCAN spatial clustering on the filtered vector, minimum length of the buried section is specified as a parameter.

Figure 7:
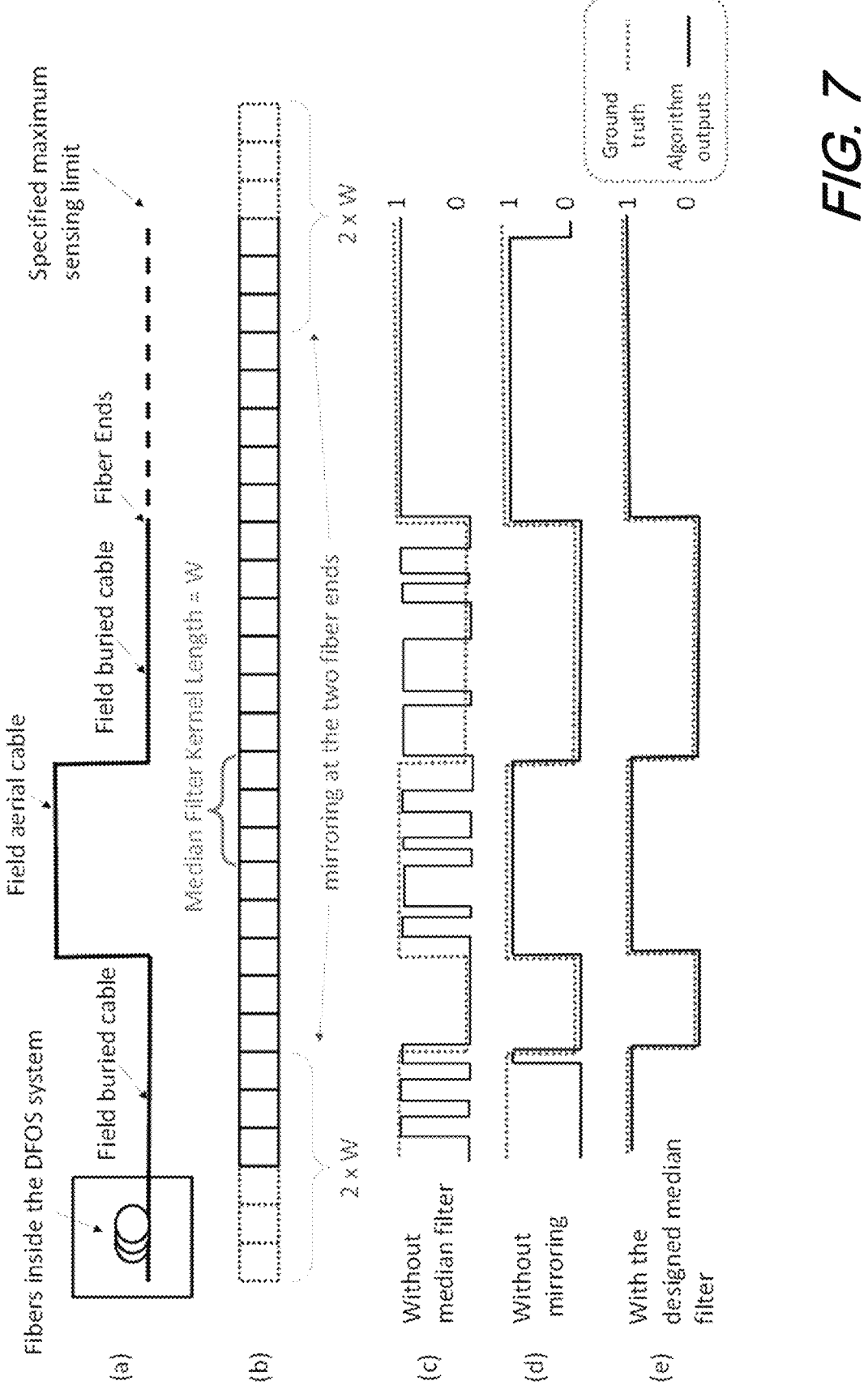
FIG. 7 is a series of plots illustrating median filter design for spatial smoothing of optical fiber data according to aspects of the present disclosure.

FIG. 7 is a series of plot traces illustrating median filter design for spatial smoothing of optical fiber data along the optical fiber cable route according to aspects of the present disclosure. The spatial data could be the original waterfall data or the processed quantile statistics. As shown in plot trace (a), the cable route contains: (1) fibers inside the DFOS system that can generate large vibration continuously, (2) two buried sections, (3) one aerial sections, and (4) sections after fiber end. The distributed sensor configuration specifies the maximum sensing monitoring range (e.g., 50 km for typical DAS in the market). In practice, the field cable can be any lengths less than the maximum sensing monitoring range.

At each time point, the sense data can be represented as a vector with length L shown in plot trace (b). The objective of the algorithm is to distinguish buried sections without any supervision.

Due to the influence of external factors such as traffic or wind, the intensity along the fiber route fluctuates. As illustrated in plot trace (c), without applying the median filter, the algorithm could yield sup-optimal results. A spatial smoothing procedure is applied to remove these artifacts. However, the two ends of the fiber route still require special treatments of mirroring. This is because waterfall noise inside the DFOS is generated at the start point of the data (caused by the fan vibrations inside the DFOS system). We would like to mask the Noise at the start of Waterfall.

As is shown in plot trace (b), on each end, a vector of length W is concatenated, with values symmetrically mirrored to the first W (or last W) valued sensed. After mirroring, the length of the vector becomes L+2W. Median filter yields correct results as shown in plot trace (e).

After the spatiotemporal processing of the distributed sensor data, each location is represented as a number representing the average level of vibrating intensity. There is no fixed threshold that could separate buried cable section from aerial cable sections. There is no time to label data and train a classifier on the same route. If the classifier is trained on a different route under different sensor configuration, there is no guarantee that the classifier can be generalized to the new route. Therefore, supervise learning approaches are not appropriate.

The number of aerial or buried sections along each route is also unknown. As a result, many clustering methods that requires pre-specification of the number of clusters cannot be applied.

Spatial clustering methods such as DBSCAN-density-based spatial clustering of applications with noise can be applied to solve this problem, as it does not require the number of clusters to be specified.

Parameter Setting I—The Number of Samples: The minimum length of the buried section is specified as a parameter in DBSCAN (e.g., 100 meters), which limits the minimum number of samples (or total weight) in a neighborhood for a point to be considered as a core point.

Parameter Setting II—Distance between Samples: After frequency domain processing, and spatial-temporal smoothing, the maximum fluctuation of statistics is significantly reduced, especially for buried section. This parameter specifies the range of intensities between the strongest and weakest buried points, to be considered as in the same cluster.

Output Interpretation: After this step, the vector of cable route is partitioned into K clusters and noises (indicated by the number $-1$), that is $[-1, 0, 1, \ldots, K]$. Table 2 summarizes the interpretation of DBSCAN unique outputs. It can cover a variety of route conditions, both with and without aerial sections.

Besides the fact that the number $-1$ always indicates noise, we still do not know, which number indicates a buried section, and which indicates aerial sections.

5: Post-processing—Label switching: Identify the low-intensity cluster as the buried section. To address the label switching issue of the clustering algorithm, a post-processing procedure is added. The pseudo code of the algorithm is written as follows:

```
if DBSCAN outputs more than one labels:
   COMPUTE the median values of locations with label 0, X_0
   for every other labels:
      COMPUTE the median values of locations, X_k
      if X_k < X_0:
         SWITCH the two labels
```

Any clusters with the lowest intensity as the "buried" section are labelled as "0". The "probability" of one location to be "buried", is defined by the proportion of "0" s across the total CSV files.

Figure 8:
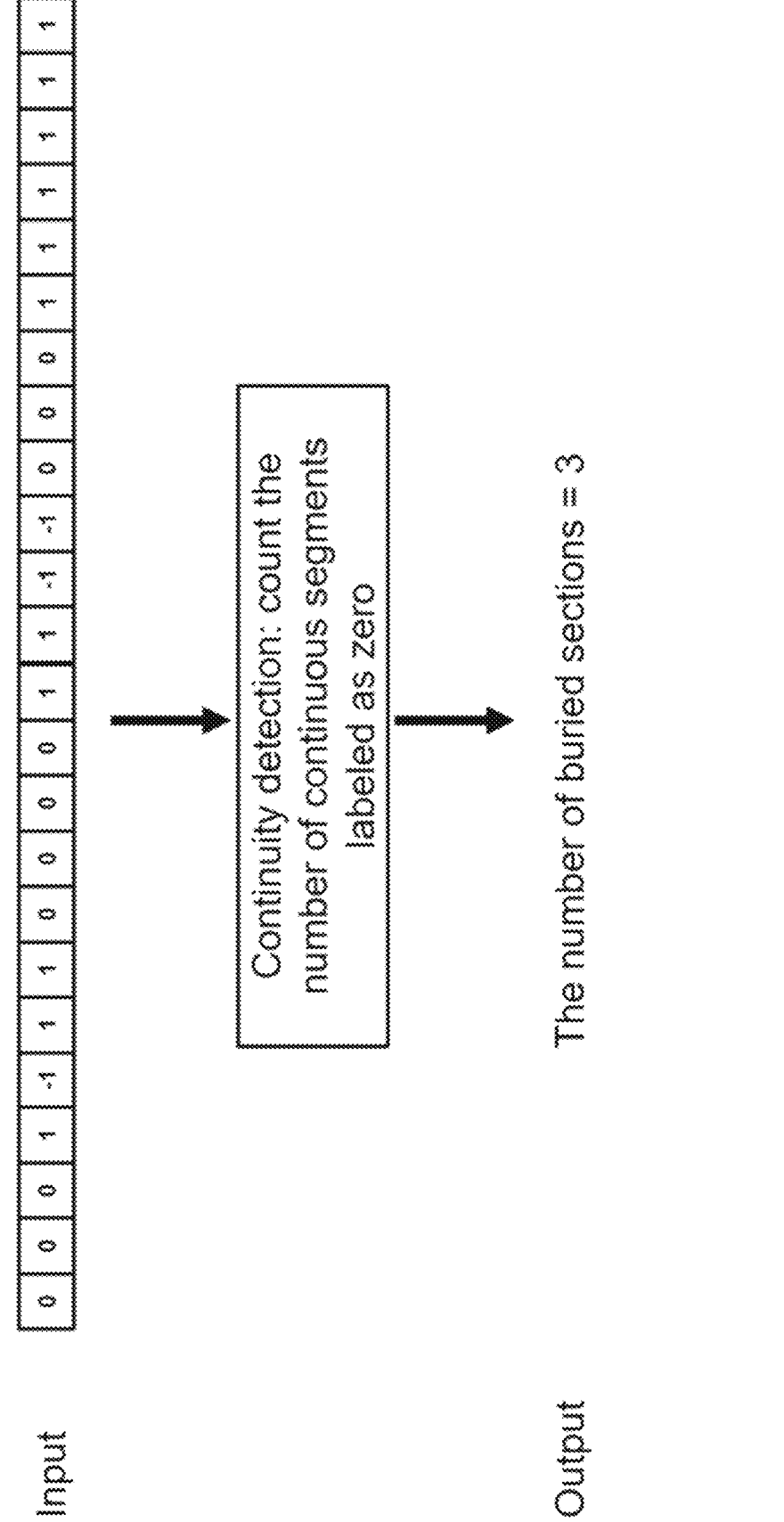
FIG. 8 is a schematic diagram showing illustrative continuity detection compute the total number of buried sections according to aspects of the present disclosure.

Note that multiple buried sections might be labeled as the same number 0. To get the number of buried sections within a route, a continuity detection step can be applied along the route as shown in FIG. 8, which is a schematic diagram showing illustrative continuity detection compute the total number of buried sections according to aspects of the present disclosure.

6: Cumulate evidence, the detection results can be accumulated across multiple time periods. At each location a:

$$Prob(\text{location } a \text{ is buried}) = \frac{\sum_t \text{location } a \text{ is determined as time } t}{\text{total number of time periods}}$$

then get a new chunk of data and go to step (1).

Figure 9:
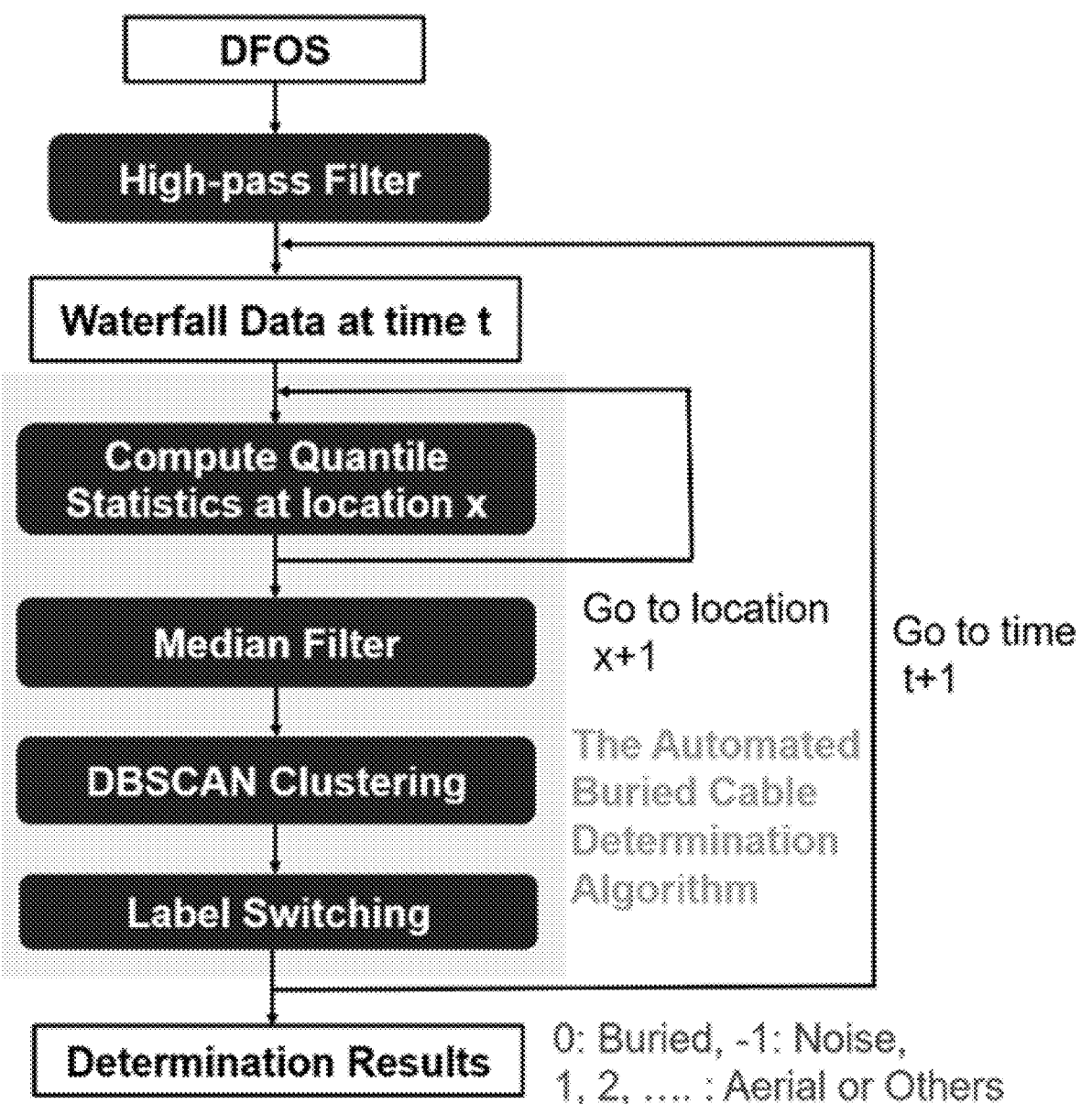
FIG. 9 is a schematic flow diagram showing illustrative data processing workflow of the automated buried optical fiber cable detection and determination according to aspects of the present disclosure.

The flowchart of the buried cable determination algorithm is detailed in FIG. 9 which is a schematic flow diagram showing illustrative data processing workflow of the automated buried optical fiber cable detection and determination according to aspects of the present disclosure. For offline processing of long-term data (for example, 24×7 Hours), we may end up with a huge number of data files. Multiprocessing can be used to process them in parallel.

For the long-time cable status monitoring application, the buried cable determination method can be applied to analyze the data stream in a moving window. The most recent data is compared to a historical baseline to detect changes in status. Selecting two time periods, the short-time status of a cable location can be compared to a longer period of the status at the same location, to see if there are any changes.

Figure 10:
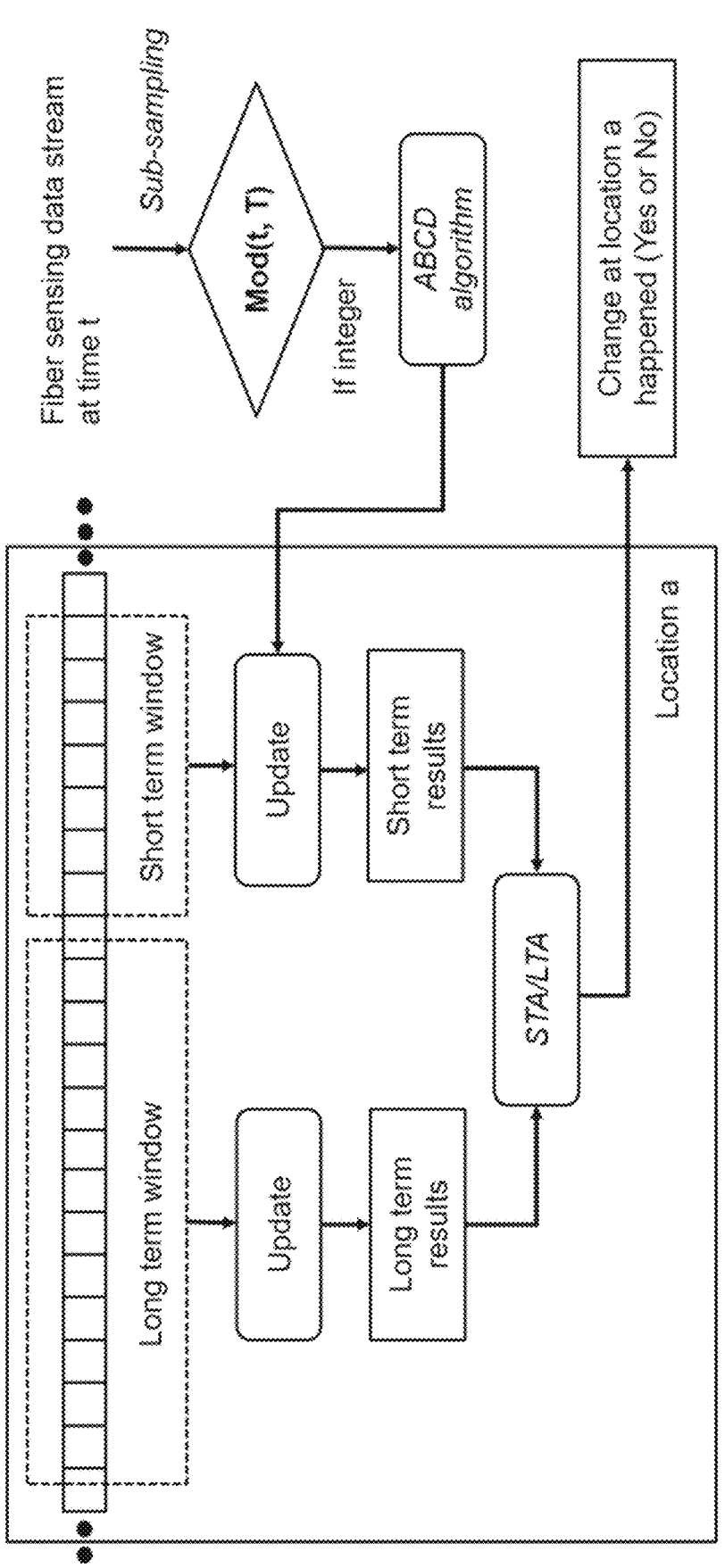
FIG. 10 is a schematic diagram showing illustrative long-time monitoring of optical fiber cable status change for the automated buried optical fiber cable detection and determination according to aspects of the present disclosure.

The scheme is detailed in FIG. 10, which is a schematic diagram showing illustrative long-time monitoring of optical fiber cable status change for the automated buried optical fiber cable detection and determination according to aspects of the present disclosure.

As shown in FIG. 10, a subsampling procedure is used to reduce the computation cost. At each location a, our inventive algorithm is run once every period, T. The results are used to update the short-term average results, and long-term average results. Change point detection methods such as short-term average/long-term average (STA/LTA) method is used to determine whether the status of location a changed.

In evaluating our inventive method, our testing produced a waterfall image of about 1.5 minutes for a route of 17 km, which included optical fiber cable in cross connection boxes, buried sections, aerial sections, central office sections, and a section beyond the far end (no fiber section). From that data, we observed that the noise intensity and distribution characteristics of the sections are different. Running our buried cable determination algorithm yields one line of results. We cumulated results from multiple time periods, and for each location, the proportion of times assigned as buried cable were computed. We found that this route has 3 buried cable sections: 117-200 m, 2-6.8 km, 6.9-16.5 km, thereby verifying our methodology.

At this point, while we have presented this disclosure using some specific examples, those skilled in the art will recognize that our teachings are not so limited. Accordingly, this disclosure should be only limited by the scope of the claims attached hereto.

TABLE 1

| Suitable quantile statistics for different use cases | | |
| --- | --- | --- |
| Cutting point frequency | Statistic Type | Use Cases |
| 3 Hz | Q3IQR = median + 1.5(Q0.75 − Q0.25) | Traffic Sensing |
| 30 Hz | Q0.15 | Cable Cut Prevention |

TABLE 2

| Interpretation of some typical DBSCAN outputs for different fiber routes | |
| --- | --- |
| DBSCAN Unique Outputs | Interpretation |
| 0, 1 | Fiber routes contains both buried and aerial sections |
| 0, 1, −1 | Fiber routes with buried and aerial sections, and noises |
| 0 | Fiber routes contains only buried sections |
| 0, −1 | Fiber routes with buried sections and noises |
| 0, 1, 2 | Fiber routes contains buried sections and more than one aerial sections (or aerial + fiber ends) |

The invention claimed is:

1. An automated method for determining buried optical fiber cable locations comprising: providing a distributed fiber optic sensing (DFOS) system including a length of optical sensor fiber;

an optical interrogator in optical communication with the length of optical sensor fiber, the optical interrogator configured to generate optical pulses from laser light, introduce the pulses into the optical sensor fiber and receive backscattered signals from the optical sensor fiber, and an analyzer that analyzes the received backscattered signals, the received backscattered signals originating at a plurality of locations along the length of the optical sensor fiber;

continuously operating the DFOS system and collecting received backscattered signals from the plurality of locations along the length of the optical sensing fiber, and analyzing the received backscattered signals by applying a high-pass filter with cut point frequency to the received backscattered signals to generate a vector of intensity values, wherein each intensity value corresponds to one of the plurality of locations;

for each individual one of the plurality of locations, determining quantile statistics as summary statistics based on the intensity values over a period of time; applying a median filter on the determined summary statistics to generate a filtered vector, performing spatial clustering on the filtered vector to partition the plurality of locations into one or more clusters, identifying a cluster having a lowest median intensity value from the one or more clusters;

designating all locations within the identified cluster having the lowest median intensity value as a buried location; and reporting the buried location.

2. The method of claim 1 further comprising: adding an additional length of optical sensor fiber to the optical sensor fiber, identifying any additional buried locations; and reporting the additional buried locations.

3. The method of claim 1 comprising generating a baseline of buried locations.

4. The method of claim 3 comprising comparing the generated baseline with a newly identified buried location, and reporting the newly identified buried location when that newly identified location is not included in the baseline.

5. The method of claim 3 further comprising identifying buried locations that are exposed to a surface of ground and aerial cable touching the ground surface.

* * * * *